April 26, 1927.
L. T. RHOADES
1,626,356
FIXED CONDENSER
Filed April 30, 1925        3 Sheets-Sheet 1
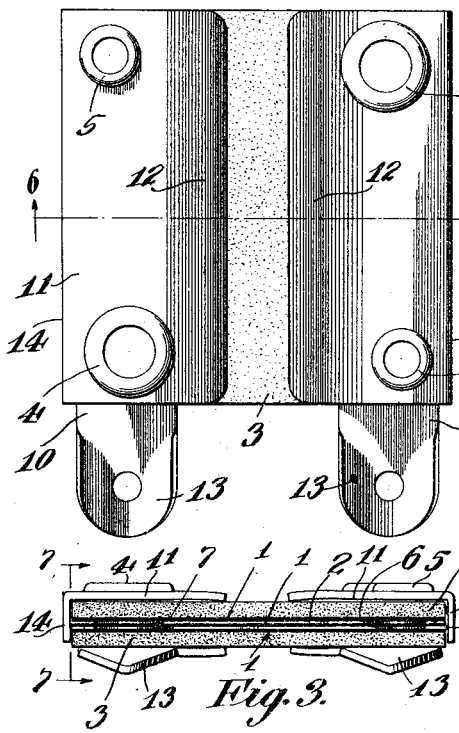
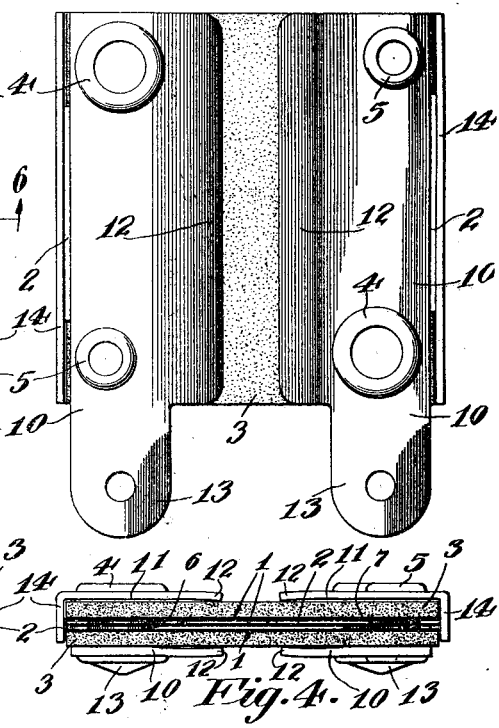
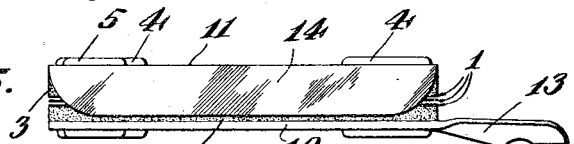
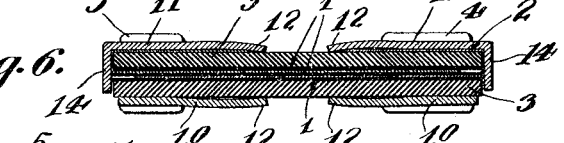
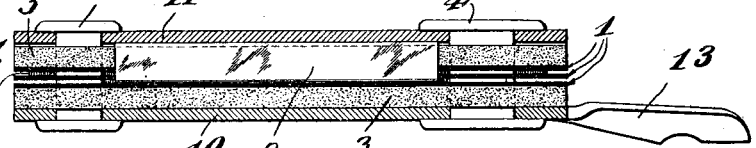
WITNESSES:
Virgil L. Mares
George A. Gruss
INVENTOR
Lewis T. Rhoades
BY Joshua R. H. Potts
HIS ATTORNEY

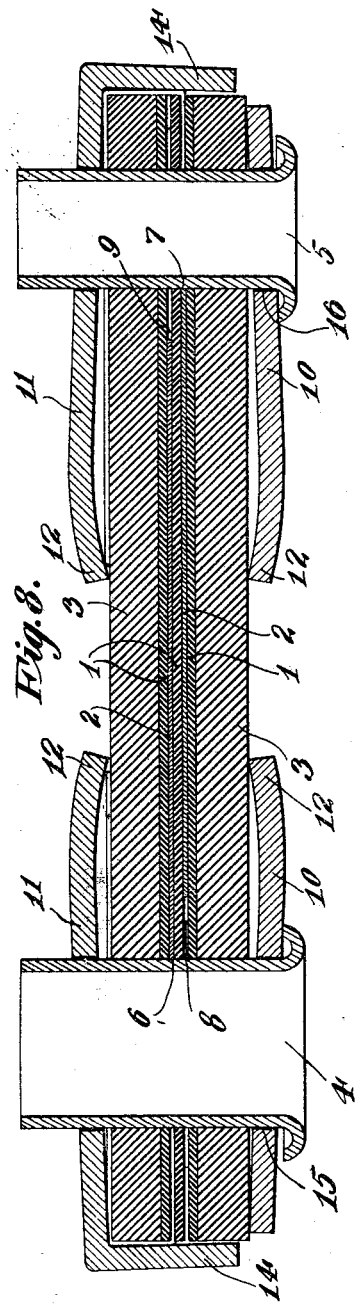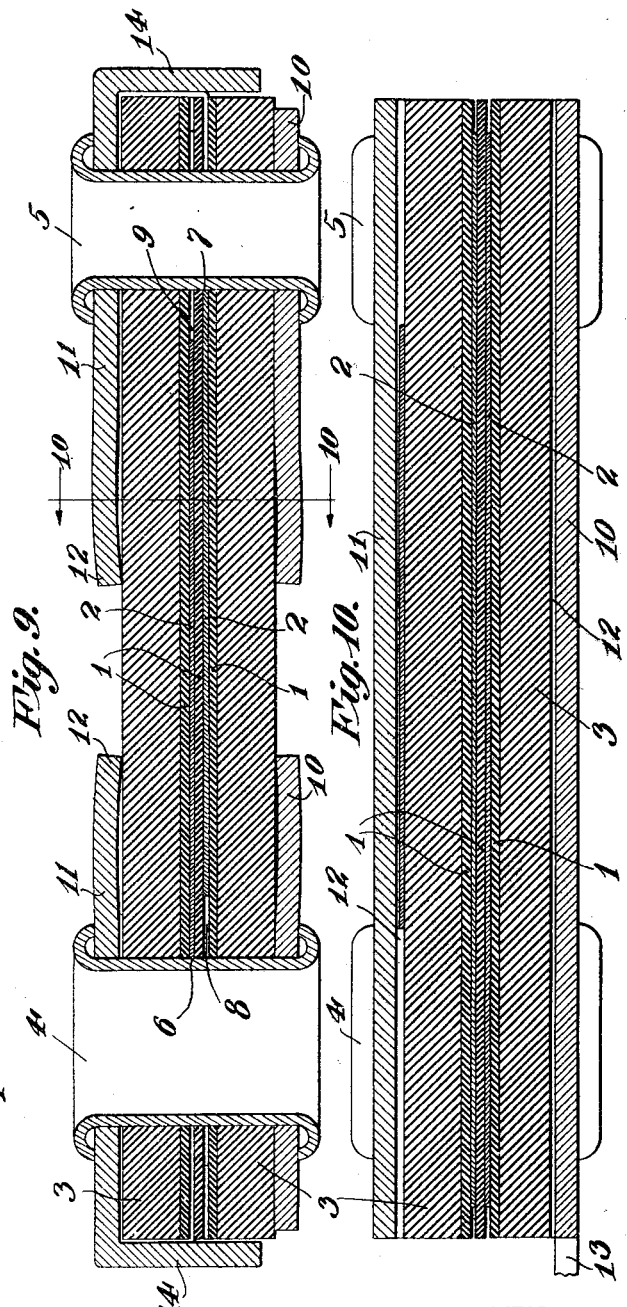

April 26, 1927.
L. T. RHOADES
1,626,356
FIXED CONDENSER
Filed April 30, 1925        3 Sheets-Sheet 3
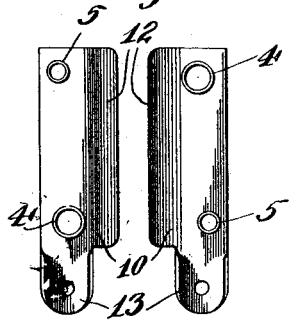
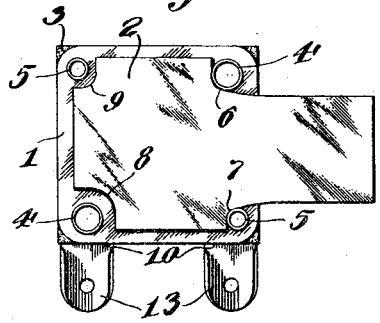
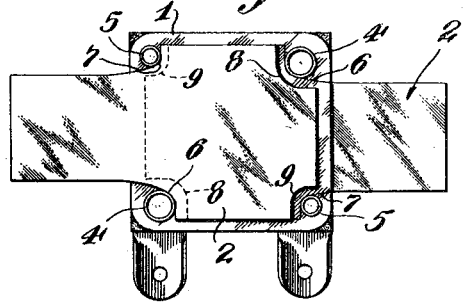
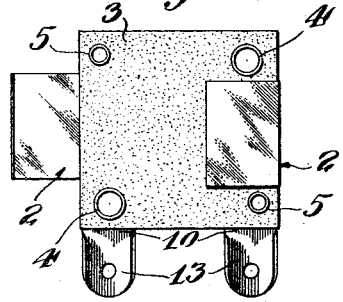
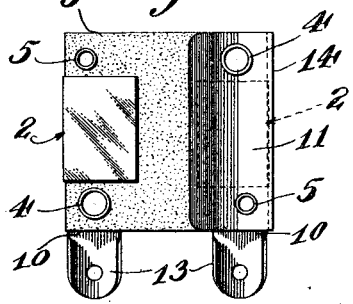
WITNESSES:
Virgil L. Mares
George A. Gruss
INVENTOR
Lewis T. Rhoades
BY
Joshua R. H. Potts
HIS ATTORNEY Patented Apr. 26, 1927.

1,626,356

UNITED STATES PATENT OFFICE.

LEWIS T. RHOADES, OF MONT CLARE, PENNSYLVANIA, ASSIGNOR TO NEW YORK COIL COMPANY, OF NEW YORK, N. Y., A CORPORATION OF NEW YORK.

FIXED CONDENSER.

Application filed April 30, 1925. Serial No. 26,896.

My invention relates to fixed condensers which are especially adapted for use with radio apparatus and wireless telegraphy.

These condensers usually consist of a plurality of sheets of mica alternating with sheets of foil, the group always containing an equal number of sheets of foil and an additional sheet of mica so that each sheet of foil is disposed between two of mica. The group of sheets so arranged is disposed between two comparatively rigid sheets of bakelite or other rigid insulating board. The alternate insulated sheets of foil are connected to different terminals of the electric circuit and the stack is usually held together by U-shaped metallic clips secured by rivets or eyelets or by pliable metallic clips pressed over opposite ends of the stack. Each clip has a terminal to which the wires are usually soldered to insure perfect electrical contact. The foil sheets are usually perforated to receive the rivets, one perforation being designed to fit one rivet and the other being large enough to permit of its being spaced from the rivet. The recognized defects in these condensers are want of uniform capacity in condensers designed to be of identical capacity; too rapid decrease in capacity; loss in capacity due to the effect of the heat imparted to the foil by the soldering operation, and the time and care required for assembling.

In order to produce condensers of practically uniform capacity when put into use the foils, which are the conducting element, must be held under such pressure as to preclude vibration; the superposed area of the foil sheets must be identical; the pressure upon the foil sheets must be as nearly uniform as possible and must be continuous, and the injurious effect of the heat from the soldering operation must be guarded against.

The want of uniformity in condensers designed for identical capacity is usually due to lack of proper co-ordination of the foil sheets or to deterioration of foil sheets caused by heat from the soldering operation or to these two causes combined.

It is well known that the stacks shrink to some extent after the condenser is completed. This decreases the pressure upon the foil sheets. It is also well known that, if the foil sheets are loose in any degree, alternating currents cause vibrations in those sheets and that, such vibrations, however minute they may be, decrease the efficiency of the condenser. Attempts have been made to prevent such vibrations by impregnating the condensers with paraffine wax or other semifluid insulating compound, but this method is objectionable because it is impossible to secure approximately equal spacing throughout the condenser without elaborate and expensive precautionary measures in applying the wax, and because the wax melts when the condenser is heated and results in decrease of efficiency.

The shrinkage in the stack, after the clips are applied, also causes an unnecessarily rapid decrease in the capacity of the condensers and, so far as I am aware, none of the condensers heretofore used provide any means of compensating for such shrinkage.

The objects of my invention are to provide a condenser of simple and economical construction which may be produced in quantities of practically identical capacity; in which the parts may be assembled rapidly and in proper co-ordination; which will retain its capacity much longer than the condensers now in use, and which will not be injuriously affected by the soldering operation.

These objects, and other advantageous ends which will be described hereinafter, I attain in the following manner, reference being had to the accompanying drawings in which—

Figure 1 is a plan view of my improved condenser,

Figure 2 an inverted plan view of the same,

Figure 3 an edge view of the condenser shown in Figure 1,

Figure 4 a rear edge view of the condenser shown in Figure 1,

Figure 5 a side edge view of the condenser shown in Figure 1,

Figure 6 a section on line 6—6 of Figure 1,

Figure 7 an enlarged section on line 7—7 of Figure 3,

Figure 8 an enlarged central section through the condenser shown in Figure 1 illustrating it before securing the condenser parts together, Figure 9 a view similar to Figure 8 illustrating the parts secured together, Figure 10 a section on line 10—10 of Figure 9, Figures 11, 12. 13, 14 and 15 plan views of elements which form a part of my invention illustrating successive steps of assembling, and Figures 16 and 17 perspective views of elements which form a part of my invention.

I have illustrated the stack as consisting of but one condenser unit. that is, a sheet of mica, a sheet of foil connected with one terminal, a sheet of mica, a second sheet of foil connected with the other terminal, and a third sheet of mica, but it is to be understood that the stack may consist of any number of such units.

In the drawings, 1 indicates the mica sheets, 2 the foil sheets and 3 the rigid insulating boards. The insulating boards and the mica sheets are perforated at points adjacent each corner to receive eyelets, rivets or bolts. I preferably use two eyelets 4 of comparatively large size at diagonally opposite corners and two eyelets 5 of comparatively small size at the other corners. The foil plates, which are imperforate consist of a body part, preferably of substantially rectangular shape, and an extension or tab, of less width than the body, which merges into the body by curved shoulders 6 and 7. In the form shown, the notch forming by shoulder 6 is deeper than that forming shoulder 7, the difference in depth corresponding to the difference in diameter of the eyelets 4 and 5. The corners at the rear of the body are also cut away to form notches 8 and 9. As shown notch 8 is deeper than notch 9 in order that when the foil sheet is in position, with shoulder 6 engaging a large eyelet and shoulder 7 engaging a small eyelet, notch 8 will afford sufficient clearance for a large eyelet and notch 9 of sufficient clearance for a small eyelet.

Eyelets of comparatively small size are sufficient to secure the parts of the stack to each other but in some installations it is more convenient to connect the terminals with eyelets instead of with extensions 13 and the larger eyelets may be utilized for that purpose. If however eyelets of uniform size are used shoulders 6 and 7 and notches 8 and 9 should be of uniform size.

For securing the stack elements to each other, I use resilient clamping plates 10 and 11 which may be of spring brass and are of substantial width. The clamping plates are curved inwardly throughout their contacting length as indicated at 12. Clamping plates 10, on one face of the stack, are provided with extensions 13 to serve as terminals. The outer side-edge of plates 11, on the other face of the stack, is preferably bent substantially at right angles to the general plane of the plate to provide flanges 14 to engage and protect the foil sheets and make good electrical contact therewith, but the edge of the flange is spaced from plates 10. The clamping plates are perforated at 15 and 16 to receive the eyelets.

By use of resilient clamping plates of the kind described pressure is applied to the stack near the center line of the insulating boards and the pressure follows up any shrinkage of the stack, so that the stack is always under pressure. This not only avoids waste of current but permits use of thinner insulating plates, thereby decreasing cost of manufacture.

Inasmuch as the clamping plates 10, which carry the terminals, do not contact with the foil sheets which fuse at low temperature and heat does not radiate readily through the eyelets, danger of injury to the foil sheets by heat is eliminated.

Care and time are required for fitting foil sheets over eyelets or like members. By providing my foil sheets with curved shoulders at the junction of the tabs and the body part, the sheets may be placed in approximate position and by drawing the flaps outwardly until the curved shoulders engage the eyelets, which may be done by placing a finger or fingers on the flap, perfect alignment is insured and the operation is practically instantaneous.

By insuring proper co-ordination of the foil sheets and eliminating danger of injury by heat from the soldering operation, I am enabled to obtain better and more durable condensers and to obtain quantity production of condensers of uniform capacity.

While I prefer to use curved resilient plates on both faces of the condenser, good results may be obtained by use of resilient plates on one face and stiff plates upon the other. The resilient plates may be of U-shape but would not have all the advantages of the two-part construction.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a fixed condenser of the class described; a stack of alternate insulating and conducting sheets interposed between rigid outer sheets of insulating material; means for automatically maintaining uniform pressure upon the stack, said means consisting of resilient clamping plates engaging a face of the stack, and means passing through the stack for holding the clamping plates in engagement with said face.

2. In a fixed condenser of the class described; a stack of alternate insulating and conducting sheets interposed between rigid outer sheets of insulating material; means for automatically maintaining uniform pressure upon the stack, said means consisting of opposed resilient clamping plates engaging the faces of the stack, and means passing through the stack for holding the clamping plates in engagement with said face.

3. In a fixed condenser of the class described, a stack of alternate insulating and conducting sheets interposed between rigid outer sheets of insulating material; means for automatically maintaining uniform pressure upon the stack, said means consisting of resilient clamping plates curved inwardly to engage a rigid outer sheet, and means passing through the stack for holding the clamping plates in engagement with said face.

4. In a fixed condenser of the class described, a stack of alternate insulating and conducting sheets interposed between rigid outer sheets of insulating material; means for automatically maintaining uniform pressure upon the stack, said means consisting of resilient clamping plates extending approximately to the central line of the stack and curved inwardly to engage a rigid outer sheet, and means passing through the stack for holding the clamping members in engagement therewith.

5. In a fixed condenser of the class described, a stack of alternate insulating and conducting sheets interposed between rigid outer sheets of insulating material; means for automatically maintaining uniform pressure upon the stack, said means consisting of opposed resilient clamping plates extending approximately to the central line of the stack and curved inwardly to engage a rigid outer sheet, and means passing through the stack for holding the clamping members in engagement therewith.

6. In a fixed condenser of the class described, a stack of alternate insulating and conducting sheets interposed between rigid outer sheets of insulating material; opposed pairs of resilient clamping plates on each end of the stack, one plate of each pair having an extension to form a terminal and being free of contact with the conducting sheets and the other member of the pair being in contact with the conducting sheets, the two members being spaced from each other.

7. In a fixed condenser of the class described, a stack of alternate insulating and conducting sheets interposed between rigid outer sheets of insulating material; opposed pairs of resilient clamping plates on each end of the stack, one plate of each pair having an extension to form a terminal and being free of contact with the conducting sheets and the other member of the pair being in contact with the conducting sheets, the two members being spaced from each other, and means passing through the stack for holding the clamping members in engagement with the faces thereof.

In testimony whereof I have signed my name to this specification.

LEWIS T. RHOADES.